US 7,786,891 B2

(12) United States Patent
Owens et al.

(10) Patent No.: US 7,786,891 B2
(45) Date of Patent: Aug. 31, 2010

(54) SYSTEM AND METHOD FOR AN INTERACTIVE SECURITY SYSTEM FOR A HOME

(75) Inventors: Steve B. Owens, Kansas City, MO (US); Mark Glenwood Kelly, Prairie Village, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 63 days.

(21) Appl. No.: 11/897,439

(22) Filed: Aug. 29, 2007

(65) Prior Publication Data
US 2007/0298772 A1 Dec. 27, 2007

Related U.S. Application Data

(63) Continuation of application No. 10/928,568, filed on Aug. 27, 2004, now abandoned.

(51) Int. Cl.
*H04M 3/42* (2006.01)
(52) U.S. Cl. ............................. 340/825.72; 340/539.11; 348/154; 348/156; 455/420
(58) Field of Classification Search ............ 340/825.69, 340/825.72, 3.71, 7.21, 539.1, 539.11; 434/308, 434/350; 348/152–156, 734; 455/420
See application file for complete search history.

(56) References Cited

U.S. PATENT DOCUMENTS

| 3,703,714 | A |   | 11/1972 | Andrews |
|---|---|---|---|---|
| 3,997,718 | A |   | 12/1976 | Ricketts et al. |
| 4,103,337 | A |   | 7/1978 | Whiteside |
| 4,303,937 | A |   | 12/1981 | Cook |
| 4,375,637 | A |   | 3/1983 | Desjardins |
| 4,656,656 | A |   | 4/1987 | Mundy et al. |
| 4,866,515 | A |   | 9/1989 | Tagawa et al. |
| 4,872,195 | A |   | 10/1989 | Leonard |
| 4,959,713 | A | * | 9/1990 | Morotomi et al. ........... 348/156 |
| 4,992,866 | A | * | 2/1991 | Morgan ...................... 348/159 |
| 5,027,211 | A |   | 6/1991 | Robertson |
| 5,061,916 | A |   | 10/1991 | French et al. |
| 5,086,385 | A |   | 2/1992 | Launey et al. |
| 5,109,222 | A |   | 4/1992 | Welty |
| 5,172,413 | A |   | 12/1992 | Bradley et al. |

(Continued)

FOREIGN PATENT DOCUMENTS

EP  1 445 917  8/2004

(Continued)

OTHER PUBLICATIONS

Non-Final Office Action date mailed Jan. 21, 2009 for U.S. Appl. No. 10/694,337.

(Continued)

*Primary Examiner*—Edwin C Holloway, III
(74) *Attorney, Agent, or Firm*—Sonnenschein Nath & Rosenthal LLP

(57) ABSTRACT

A system and method for displaying video in a residence. An indication of an alert is received as communicated from a security system of a residence. The indication of the alert is communicated to a cellular telephone. A selection of a television communicated from the cellular telephone is received. The television is selected from multiple televisions located within the residence. A command is communicated to display one or more images on the selected televisions.

19 Claims, 6 Drawing Sheets

U.S. PATENT DOCUMENTS

| | | | |
|---|---|---|---|
| 5,187,735 A | 2/1993 | Garcia et al. | |
| 5,310,349 A | 5/1994 | Daniels et al. | |
| 5,479,267 A | 12/1995 | Hashimoto | |
| 5,550,863 A | 8/1996 | Yurt et al. | |
| 5,565,908 A | 10/1996 | Ahmad | |
| 5,585,838 A | 12/1996 | Lawler et al. | |
| 5,594,786 A | 1/1997 | Chaco et al. | |
| 5,601,432 A | 2/1997 | Bergman | |
| 5,621,456 A | 4/1997 | Florin et al. | |
| 5,684,952 A | 11/1997 | Stein | |
| 5,689,242 A | 11/1997 | Sims et al. | |
| 5,790,176 A | 8/1998 | Craig | |
| 5,790,935 A | 8/1998 | Payton | |
| 5,940,594 A | 8/1999 | Ali et al. | |
| 6,020,881 A | 2/2000 | Naughton et al. | |
| 6,038,425 A | 3/2000 | Jeffrey | |
| 6,049,823 A | 4/2000 | Hwang | |
| 6,060,994 A | 5/2000 | Chen et al. | |
| 6,072,395 A | 6/2000 | Vega | |
| 6,149,441 A | 11/2000 | Pellegrino et al. | |
| 6,182,128 B1 | 1/2001 | Kelkar et al. | |
| 6,185,773 B1 | 2/2001 | Goedde | |
| 6,192,282 B1 | 2/2001 | Smith et al. | |
| 6,233,428 B1 | 5/2001 | Fryer | |
| 6,240,410 B1 | 5/2001 | Wical | |
| 6,370,323 B1 | 4/2002 | Adolph et al. | |
| 6,374,079 B1 | 4/2002 | Hsu | |
| 6,438,596 B1 | 8/2002 | Ueno et al. | |
| 6,501,502 B1 | 12/2002 | Chen | |
| 6,507,726 B1 | 1/2003 | Atkinson et al. | |
| 6,561,812 B1 | 5/2003 | Burmester et al. | |
| 6,603,847 B1 | 8/2003 | Griffith | |
| 6,661,340 B1 | 12/2003 | Saylor et al. | |
| 6,748,597 B1 | 6/2004 | Frisco et al. | |
| 6,769,127 B1 | 7/2004 | Bonomi et al. | |
| 6,775,518 B2 | 8/2004 | Norcott et al. | |
| 6,813,777 B1 | 11/2004 | Weinberger et al. | |
| 6,844,807 B2 | 1/2005 | Inoue et al. | |
| 6,879,243 B1 | 4/2005 | Booth et al. | |
| 6,925,499 B1 | 8/2005 | Chen et al. | |
| 6,975,346 B2 | 12/2005 | Kumhyr | |
| 7,028,096 B1 | 4/2006 | Lee | |
| 7,035,390 B2 | 4/2006 | Elliott | |
| 7,046,689 B2 | 5/2006 | Burns et al. | |
| 7,123,142 B2 | 10/2006 | Bohbot et al. | |
| 7,159,233 B2 | 1/2007 | Son et al. | |
| 7,185,282 B1 | 2/2007 | Naidoo et al. | |
| 7,246,369 B1 | 7/2007 | Duan et al. | |
| 7,697,927 B1 | 4/2010 | Owens | |
| 7,714,728 B2 | 5/2010 | Koblaz | |
| 2002/0033760 A1* | 3/2002 | Kobayashi | 340/825.52 |
| 2002/0038461 A1 | 3/2002 | White et al. | |
| 2002/0048224 A1 | 4/2002 | Dygert et al. | |
| 2002/0049977 A1 | 4/2002 | Miller et al. | |
| 2002/0112121 A1 | 8/2002 | Gerszberg et al. | |
| 2002/0124258 A1 | 9/2002 | Fritsch | |
| 2002/0138842 A1 | 9/2002 | Chong et al. | |
| 2002/0164155 A1 | 11/2002 | Mate | |
| 2002/0166123 A1 | 11/2002 | Schrader et al. | |
| 2002/0170064 A1 | 11/2002 | Monroe et al. | |
| 2002/0180579 A1* | 12/2002 | Nagaoka et al. | 340/3.1 |
| 2003/0009668 A1 | 1/2003 | Chan et al. | |
| 2003/0046369 A1 | 3/2003 | Sim et al. | |
| 2003/0050935 A1 | 3/2003 | Spetsmann | |
| 2003/0051239 A1 | 3/2003 | Hudspeth | |
| 2003/0105854 A1 | 6/2003 | Thorsteinsson et al. | |
| 2003/0121050 A1 | 6/2003 | Kalva et al. | |
| 2003/0123450 A1 | 7/2003 | Wright et al. | |
| 2003/0182420 A1 | 9/2003 | Jones et al. | |
| 2003/0191802 A1 | 10/2003 | Zhao et al. | |
| 2003/0200009 A1* | 10/2003 | von Kannewurff et al. | 700/275 |
| 2003/0204856 A1 | 10/2003 | Buxton | |
| 2003/0208762 A1 | 11/2003 | Hanai et al. | |
| 2004/0003051 A1 | 1/2004 | Krzyzanowski et al. | |
| 2004/0015993 A1 | 1/2004 | Yacenda et al. | |
| 2004/0039757 A1 | 2/2004 | McClure | |
| 2004/0049789 A1 | 3/2004 | Bower et al. | |
| 2004/0117638 A1 | 6/2004 | Monroe | |
| 2004/0117647 A1 | 6/2004 | Ballard | |
| 2004/0148632 A1 | 7/2004 | Park et al. | |
| 2004/0172658 A1 | 9/2004 | Rakib et al. | |
| 2004/0194148 A1 | 9/2004 | Schultz et al. | |
| 2004/0210944 A1 | 10/2004 | Brassil et al. | |
| 2004/0253945 A1 | 12/2004 | Janik | |
| 2004/0268410 A1 | 12/2004 | Barton et al. | |
| 2005/0003338 A1 | 1/2005 | Norcott et al. | |
| 2005/0028208 A1 | 2/2005 | Ellis et al. | |
| 2005/0044166 A1 | 2/2005 | Colville et al. | |
| 2005/0078934 A1 | 4/2005 | Fish et al. | |
| 2005/0080818 A1 | 4/2005 | Kindberg et al. | |
| 2005/0125083 A1 | 6/2005 | Kiko | |
| 2005/0131957 A1 | 6/2005 | Watkinson | |
| 2005/0177853 A1 | 8/2005 | Williams et al. | |
| 2005/0193098 A1 | 9/2005 | Khandpur et al. | |
| 2005/0206513 A1 | 9/2005 | Fallon | |
| 2005/0215244 A1 | 9/2005 | Whitson | |
| 2005/0254440 A1 | 11/2005 | Sorrell | |
| 2005/0278773 A1 | 12/2005 | DeCinque et al. | |
| 2006/0004606 A1 | 1/2006 | Wendl et al. | |
| 2006/0005224 A1 | 1/2006 | Dunning et al. | |
| 2006/0020993 A1 | 1/2006 | Hannum et al. | |
| 2006/0069736 A1 | 3/2006 | Czeisler et al. | |
| 2006/0085824 A1 | 4/2006 | Bruck et al. | |
| 2006/0088806 A1 | 4/2006 | Quinn | |
| 2006/0220798 A1 | 10/2006 | Willis | |
| 2007/0006276 A1 | 1/2007 | Ashley et al. | |
| 2007/0050828 A1 | 3/2007 | Renzi et al. | |
| 2007/0130590 A1 | 6/2007 | Nash-Putnam | |
| 2008/0016545 A1 | 1/2008 | DeCinque et al. | |
| 2008/0092168 A1 | 4/2008 | Logan et al. | |

FOREIGN PATENT DOCUMENTS

| | | |
|---|---|---|
| JP | 2002-002486 | 1/2002 |

OTHER PUBLICATIONS

Non-Final Office Action date mailed Dec. 11, 2008 for U.S. Appl. No. 10/803,046.

Non-Final Office Action date mailed Nov. 10, 2008 for U.S. Appl. No. 10/951,740.

Response filed Feb. 10, 2009 to Non-Final Office Action date mailed Nov. 10, 2008 for U.S. Appl. No. 10/951,740.

Advisory Action date mailed Jul. 28, 2008 for U.S. Appl. No. 10/928,568.

RCE/Response filed Oct. 28, 2008 to Final Office Action date mailed Apr. 28, 2008 for U.S. Appl. No. 10/928,568.

Non-Final Office Action date mailed Jan. 9, 2009 for U.S. Appl. No. 10/928,568.

Final Office Action date mailed Jan. 7, 2009 for U.S. Appl. No. 11/074,861.

Sprint TekNet IP for Higher Education press release, Jul. 2003.

Sprint TekNet IP Overview press release, Jul. 2003.

System Integrates All School Tech Functions press release, Jul. 2003.

Sprint TekNet IP Integrated Communications System, Installation Overview, 2001.

Sprint TekNet IP Installation Manual, Oct. 2001.

IC-Net Systems—FF Coax Network, ICC-Smart TV Controllers, Feb. 2004.

TrueCom Building Communications Systems Communications Controllers 5120 Series, May 1998, Publication S5120-0012-7, pp. 1-6.

Advancements Bring Windows-based Software, Ethernet Network Compatibility to 5120 Intercom Systems, Feb. 2001, pp. 1-2.

Non-Final Office Action dated Mar. 23, 2007 for U.S. Appl. No. 10/236,286.
Response filed Jul. 23, 2007 to Non-Final Office Action dated Mar. 23, 2007 for U.S. Appl. No. 10/236,286.
Final Office Action dated Oct. 16, 2007 for U.S. Appl. No. 10/236,286.
Response filed Oct. 26, 2007 to Final Office Action dated Oct. 16, 2007 for U.S. Appl. No. 10/236,286.
Advisory Action dated Nov. 19, 2007 for U.S. Appl. No. 10/236,286.
Non-Final Office Action dated Feb. 13, 2008 for U.S. Appl. No. 10/236,286.
Response filed May 13, 2008 to Non-Final Office Action dated Feb. 13, 2008 for U.S. Appl. No. 10/236,286.
Final Office Action dated Sep. 10, 2008 for U.S. Appl. No. 10/236,286.
Non-Final Office Action dated Dec. 11, 2007 for U.S. Appl. No. 10/803,046.
Response filed Mar. 11, 2008 to Non-Final Office Action dated Dec. 11, 2007 for U.S. Appl. No. 10/803,046.
Final Office Action dated Jun. 3, 2008 for U.S. Appl. No. 10/803 046.
Response filed Sep. 3, 2008 to Final Office Action dated Jun. 3, 2008 for U.S. Application No. 10/803,046.
Non-Final Office Action dated Nov. 16, 2006 for U.S. Application No. 10/928,568.
Response filed Feb. 16, 2007 to Non-Final Office Action dated Nov. 16, 2006 for U.S. Appl. No. 10/928,568.
Final Office Action dated May 21, 2007 for U.S. Appl. No. 10/928,568.
Response filed Jul. 20, 2007 to Final Office Action dated May 21, 2007 for U.S. Appl. No. 10/928,568.
Non-Final Office Action dated Oct. 10, 2007 for U.S. Appl. No. 10/928,568.
Response filed Jan. 8, 2007 to Non-Final Office Action dated Oct. 10, 2007 for U.S. Appl. No. 10/928,568.
Final Office Action dated Apr. 28, 2008 for U.S. Appl. No. 10/928,568.
RCE and Response filed Jun. 30, 2008 to Final Office Action dated Apr. 28, 2008 for U.S. Appl. No. 10/928,568.
Non-Final Office Action dated Aug. 1, 2008 for U.S. Appl. No. 11/074,861.
Response filed Nov. 3, 2008 to Non-Final Office Action dated Aug. 1, 2008 for U.S. Appl. No. 11/074,861.
Non-Final Office Action dated Oct. 18, 2007 for U.S. Appl. No. 11/042,263.
Response filed Jan. 18, 2008 Non-Final Office Action dated Oct. 18, 2007 for U.S. Appl. No. 11/042,263.
Final Office Action dated Apr. 18, 2008 for U.S. Appl. No. 11/042,263.
RCE and Response filed Jul. 18, 2008 Final Office Action dated Apr. 18, 2008 for U.S. Appl. No. 11/042,263.
Non-Final Office Action dated Aug. 21, 2008 for U.S. Appl. No. 11/042,263.
Response filed Nov. 21, 2008 Non-Final Office Action dated Aug. 21, 2008 for U.S. Appl. No. 11/042,263.
Response filed Mar. 18, 2009 to Non-Final Action dated Jan. 21, 2009 in U.S. Appl. No. 10/694,337.
Final Rejection date mailed Jun. 18, 2009 in U.S. Appl. No. 10/694,337.
Response filed Aug. 13, 2009 to Final Rejection dated Jun. 18, 2009 in U.S. Appl. No. 10/694,337.
Advisory Action date mailed Aug. 31, 2009 in U.S. Application No. 10/694,337.
Pre-Appeal Brief Reqeust For Review and Remarks to same; Notice of Appeal all filed on Sep. 18, 2009 in U.S. Appl. No. 10/694,337.
Pre-Appeal Conference Decision date mailed Nov. 18, 2009 in U.S. Appl. No. 10/694,337.
RCE/Amendment filed Dec. 16, 2009 in U.S. Appl. No. 10/694,337.

Non-Final Rejection date mailed Jan. 20, 2010 in U.S. Appl. No. 10/694,337.
Non-Final Office Action dated Dec. 11, 2008 in U.S. Appl. No. 10/803,046.
Response filed Mar. 11, 2009 to Non-Final Action dated Dec. 11, 2008 in U.S. Appl. No. 10/803,046.
Final Rejection date mailed Jul. 14, 2009 in U.S. Appl. No. 10/803,046.
Response filed Sep. 14, 2009 to Final Action dated Jul. 14, 2009 in U.S. Appl. No. 10/803,046.
Advisory Action date mailed Oct. 1, 2009 in U.S. Appl. No. 10/803,046.
RCE/Amendment filed Dec. 14, 2009 in U.S. Appl. No. 10/803,046.
Final Rejection date mailed Jun. 19, 2009 in U.S. Appl. No. 10/951,740.
RCE/Amendment filed Sep. 1, 2009 to Final Rejection dated Jun. 19, 2009 in U.S. Appl. No. 10/951,740.
Non-Final Rejection date mailed Oct. 15, 2009 in U.S. Appl. No. 10/951,740.
Response filed Jan. 15, 2010 to Non-Final Rejection date mailed Oct. 15, 2009 in U.S. Appl. No. 10/951,740.
Response filed Apr. 9, 2009 to Non-Final Action date mailed Jan. 29, 2009 in U.S. Appl. No. 10/928,568.
Final Rejection date mailed Jul. 30, 2009 U.S. Appl. No. 10/928,568.
Final Rejection date mailed Mar. 4, 2009 in U.S. Appl. No. 11/042,263.
Pre-Appeal Request For Review and Remarks to same; Notice of Appeal all filed on Apr. 10, 2009 in U.S. Appl. No. 11/042,263.
Pre-Brief Appeal Conference Decision date mailed Sep. 8, 2009 in U.S. Appl. No. 11/042,263.
Notice of Allowance and Fees Due date mailed Dec. 7, 2009 in U.S. Appl. No. 11/042,263.
RCE/Amendment filed Feb. 27, 2009 to Final Action dated Jan. 7, 2009 in U.S. Appl. No. 11/074,861.
Non-Final Rejection date mailed Mar. 23, 2009 in U.S. Appl. No. 11/074,861.
Response filed Apr. 16, 2009 to Non-Final Rejection date mailed Mar. 23, 2009 in U.S. Appl. No. 11/074,861.
Final Rejection date mailed Jun. 10, 2009 in U.S. Appl. No. 11/074,861.
Response filed Aug. 10, 2009 to Final Action dated Jun. 10, 2009 in U.S. Appl. No. 11/074,861.
Advisory Action date mailed Aug. 26, 2009 in U.S. Appl. No. 11/074,861.
RCE/Amendment filed Sep. 8, 2009 in U.S. Appl. No. 11/074,861.
Non-Final Rejection date mailed Oct. 14, 2009 in U.S. Appl. No. 11/074,861.
Amendment filed Jan. 13, 2010 to Non-Final Rejection dated Oct. 14, 2009 in U.S. Appl. No. 11/074,861.
Examiner Interview Summary date mailed Jan. 13, 2010 in U.S. Appl. No. 11/074,861.
Response filed Feb. 26, 2010 to Non-Final Rejection date mailed Jan. 20, 2010 in U.S. Appl. No. 10/694,337.
Examiner Interview Summary date mailed Mar. 5, 2010 in U.S. Appl. No. 10/694,337.
Non-Final Rejection date mailed Feb. 22, 2010 in U.S. Appl. No. 10/803,046.
Final Rejection date mailed Apr. 9, 2010 issued in U.S. Appl. No. 10/951,740.
Notice of Abandonment date mailed Mar. 3, 2010 in U.S. Appl. No. 10/928,568.
Notice of Allowance date mailed Apr. 14, 2010 in U.S. Appl. No. 11/074,861.
Final Rejection date mailed May 11, 2010 in U.S. Appl. No. 10/694,337.
Non-Final Action date mailed Jun. 1, 2010 in U.S. Appl. No. 12/112,738.

* cited by examiner

SYSTEM AND METHOD FOR AN INTERACTIVE SECURITY SYSTEM FOR A HOME

CROSS-REFERENCE TO RELATED APPLICATIONS

The present application is a continuation of U.S. patent application Ser. No. 10/928,568 filed on Aug. 27, 2004, now abandoned the entire teachings of which are incorporated herein by reference.

STATEMENT REGARDING FEDERALLY SPONSORED RESEARCH OR DEVELOPMENT

None.

BACKGROUND OF THE INVENTION

1. Field of the Invention

The present invention related generally to the field of controlling facility systems. More specifically, the present invention relates to remotely controlling the systems in facilities, such as residences or schools.

2. Description of the Related Art

Facilities, e.g., residences and schools, include numerous systems which may be manually or computer-controlled.

With respect to residences, it is known that a home's locks, lights, heating ventilating and cooling (HVAC) system, garage doors, and other systems may be controlled using a personal computer (PC) or other computing system. Also known is that an emergency contacts list might exist in hard copy, or in a PC database. This list typically includes phone numbers and/or email addresses. For example, the contact information would likely include the phone numbers, email addresses for the appropriate law enforcement agency or fire department. The list also might include the contacts information for one or more neighbors which could be contacted if needed.

This information is also often alternatively maintained in a database on a personal digital assistant (PDA) device.

Homes also sometimes include surveillance systems. These surveillance systems may have numerous cameras positioned at strategic positions inside and outside the house. The cameras often feed into a VCR or other recording device in the home. Additionally, these systems may be set up so that the homeowner may observe any activity of interest (e.g., a prowler) on one or more television monitors within the home. Sensors have also incorporated into home security systems. When these sensors are tripped, audible alarms will alert the homeowner of the presence of an unwelcome intruder. A signal may also be sent to 911 or another emergency response agency automatically.

These residential facility systems are undesirably inaccessible to the absent home inhabitor. For example, a homeowner may have to leave work early to let in a family member who is without a key. Also, the absent homeowner will have no idea an alarm has been tripped in the house until notified by traditional means (e.g., contacted by the responding police). This often results in costly false alarms—depriving the law enforcement agency of valuable response time.

Newer schools often contain more elaborate systems than do residential dwellings. The typical modern school may be equipped with advanced computer-control systems. These systems are capable of controlling numerous facility systems. For example, the (i) surveillance, (ii) hardware, (iii) communications, and (iv) information systems in the school may all be controlled using a PC on a network in the facility.

School surveillance equipment has been made available to the PC on an office administrator's desk. On this, the administrator is able to observer classroom activities from numerous cameras strategically mounted in one or more spots in each classroom. The school's surveillance equipment often also includes a motion detection system which is normally activated at night and will detect unwanted intruders. Heat sensors may also be provided. These are deployed to detect unusually high temperatures—an indication of fire in the building—which will trip the facilities' audible alarms.

The school's hardware systems would likely include HVAC, lighting, bells, automatically-opened doors, door locks, and even lockers. It is known to control all these systems using a PC or other components associated with the school's local area network (LAN).

The schools communications systems have, in recent years, become increasingly elaborate. For years they have been equipped with phone, public address, and email systems. Now, however, they may also be equipped with accompanying audio-visual enhancements. For example, a video monitor may be provided in each classroom. The monitor may be used to play announcements, instructional videos, present a clock, and display other kinds of desired video content.

The school's information systems have been computer accessible to a school administrator for years. Student, teacher, parent, and other important information have long been maintained on a database in the school. Normally somewhere in the schools LAN. Different employees may have different levels of access to information. Teachers and administrators will likely be provided access to parent information in order to contact parents. This may be necessary for emergencies, e.g., if a child is hurt, or is involved in a fight.

These conventional manual and automated school facility control arrangements are somewhat effective. They do, however, have their limitations. For example, emergency situations may often occur at a time that the appropriate school representative is out of the office. Because a wayward administrator does not have access to their PC, or the school's LAN, situations may arise which make it difficult for the administrator to be contacted or respond effectively. For example, a fight may cause the principle to have to leave an important off site conference. This is because they are unable to, e.g., obtain the appropriate contact information to inform the parents that their child has been involved in a fight After-hour situations may also point to a need for increased system accessibility. For example, a teacher may forget to bring home his or her lesson plan which is in the early stages of preparation. This might require the principle to return to the school after hours to unlock the schools doors for the forgetful teacher.

Another area in which more remote-accessibility is needed is for safety. The prior art systems preclude off-site persons (e.g., school administrators, parents, police) access to the schools surveillance systems. This access would be advantageous for the purpose of observing menacing student activity—e.g., threats, violent acts, and bomb scares—without having to be physically present in the building.

Therefore, there is a need in the art for a system and method for remotely accessing the systems of a facility in order to make these systems more accessible for convenience and safety.

SUMMARY OF THE INVENTION

The present invention provides a device and method which accomplish the above objectives. This is done by providing a handheld wireless device. The device has a first remote control system. The first remote control system is adapted to interface with a first facility system. This interfacing enables the user to control a first facility system. This first system may be a surveillance system, a hardware system, a communications system, or an information system.

Examples of surveillance system equipment with which the device interfaces may include video cameras, and motion activated sensors, etc.

With respect to hardware systems, the device may interact with the facilities HVAC system, lighting systems, door and locker locks, etc.

With respect to the facilities communications systems, the device is able to interface with the buildings alarms, public-address systems, email systems, and audio-visual systems.

With respect to the facilities information systems, the device is able to interface with the facilities computer systems to pull up student and parent information. The interface also enables the user to access a database which includes electronic forms, and contact information.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
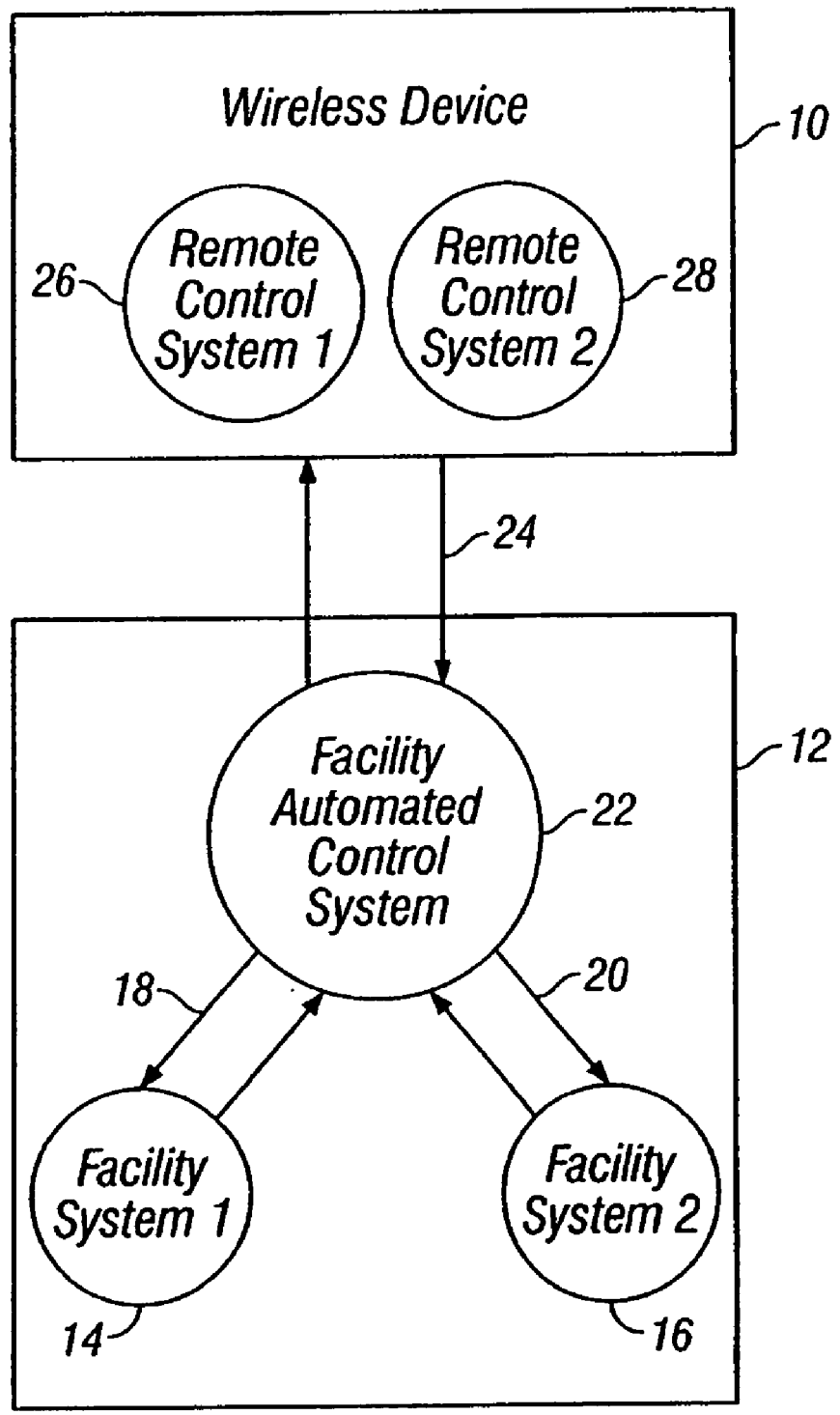
FIG. 1 is a high level schematic showing a simple representation of the wireless device/facility interface of the present invention.

The present invention provides a system and method for using a handheld wireless device to control systems in a facility remotely. The handheld device is essentially used as a remote control for the facility system. The device has a viewer which enables the user to access live video content. For example, to access video from cameras mounted in the facility. Thus, the user is able to make a visual inspection of the facility remotely.

The term "facility," as used in this specification is to be interpreted in its broadest sense. The term is not meant to require the presence of a building, or any particular kind of establishment. Rather, it is simply meant to be a location at which at least one system exists. Preferably, a plurality of systems.

At the facility, the present invention integrates video surveillance, energy management, event notification, alarm, public address, and facility information systems into one application. This application is accessible from any wireless enabled device (e.g., a handheld personal digital assistant (PDA). In one embodiment the wireless device is a java-enabled phone. Alternatively, the device could be a wireless personal digital assistant or a laptop computer which is wireless enabled.

The wireless device interfaces with the facility systems. The device is located within the coverage area of a CDMA network. In one embodiment of the present invention the device receives a wireless signal which originates from the facility. This signal typically includes information regarding the occurrence of an event. For example, the origins for the signal may be initiated from a motion detection sensor at the facility. An application on the facility's local area network transmits a notification regarding the tripping of the motion detection device to the wireless device. This notification launches an application on the device which displays an alert to the user. After the alert, the user will be provided with a menu offering different selections that can be made in response to the notification. For example, the user will have immediate access to a graphical representation of the facility's floor plan, with an indication of the exact location of the event. By making an alternative selection, the user could select cameras from which the user could view over the device any rooms in the facility that might be of interest. By making another selection, the user could choose to view a class roster, e.g. This roster would be complete with student photographs and parent contact information, and could be adapted to include any other desirable information which would be good to know in the event of an emergency, or other event. Alternatively, the user could select to view a video clip demonstrating emergency procedures for that particular location. The device could also be used to display emergency procedures to individuals at the facility, after the nature of the emergency is learned.

Hardware at the facility can also be remotely controlled using the device. This includes locks, lights, televisions, or any other type of on/off or infra-red controllable device. The HVAC systems of the facility may also be controlled using the same device. Further, it would also be possible to utilize D/A converters to control the precise location of a motor-driven device. It also might be possible to control a robotic machine to accomplish some task within the facility without requiring the presence of a human.

The communications systems of the facility may also be interfaced with using the device. This may involve activating or deactivating background music. It also might involve remotely accessing the public address system of the facility, which would enable the user to speak to students in any variety of classrooms. The device also enables the facility's video distribution systems to play video content for a particular classroom—even allowing the user to control selection and playback of prerecorded or live video content.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a hardware arrangement including a wireless device and facility hardware systems.

These facility systems may include at least one computing device which may or may not be a part of a LAN. The systems may also include surveillance, hardware controls, communications, as well as other systems. In terms of software, the wireless device as well as the facility system may each include a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 2:
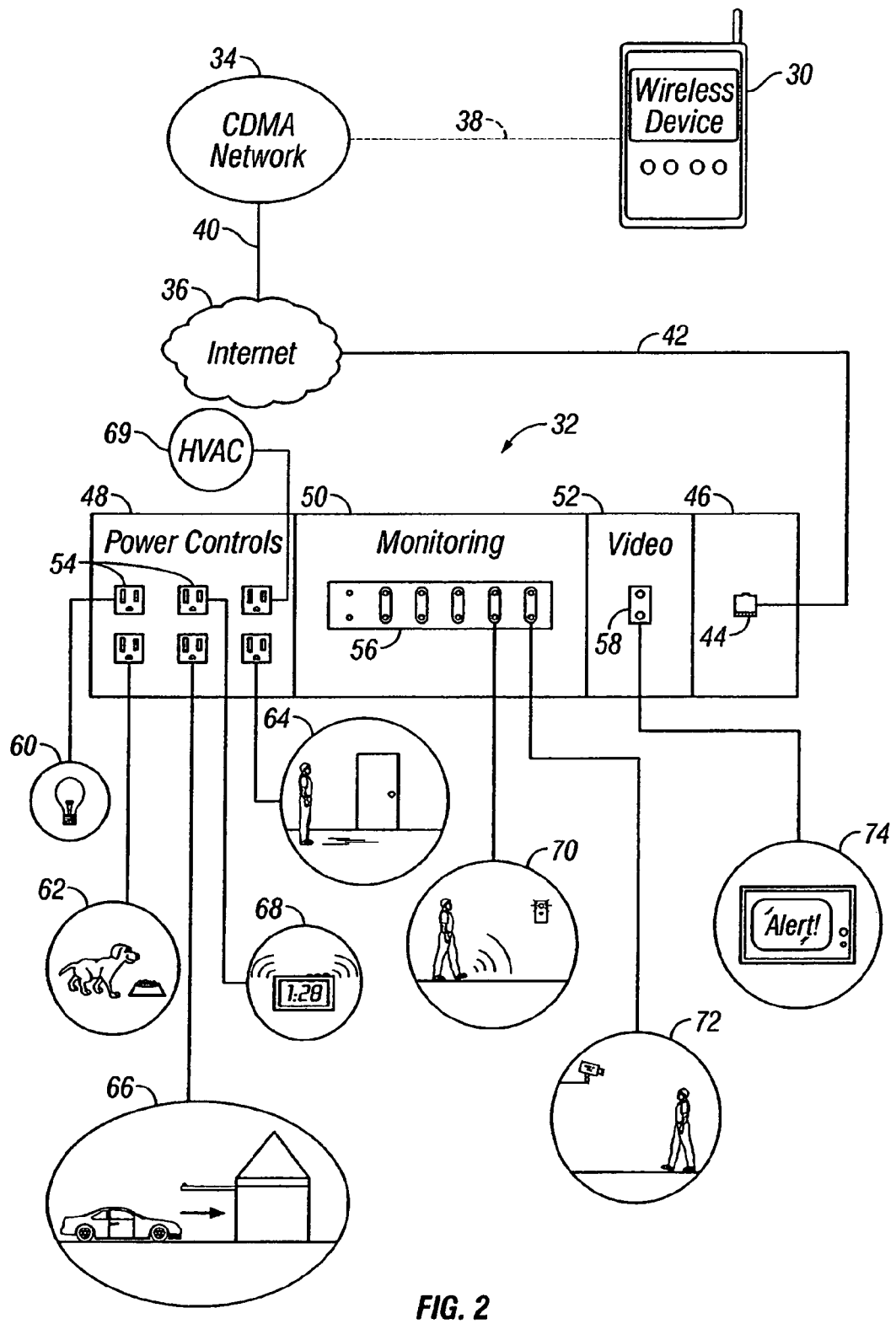
FIG. 2 shows an embodiment of the present invention showing the details regarding an in-home managing device which enables a wireless device to communicate with and control a plurality of residential systems.
Figure 3:
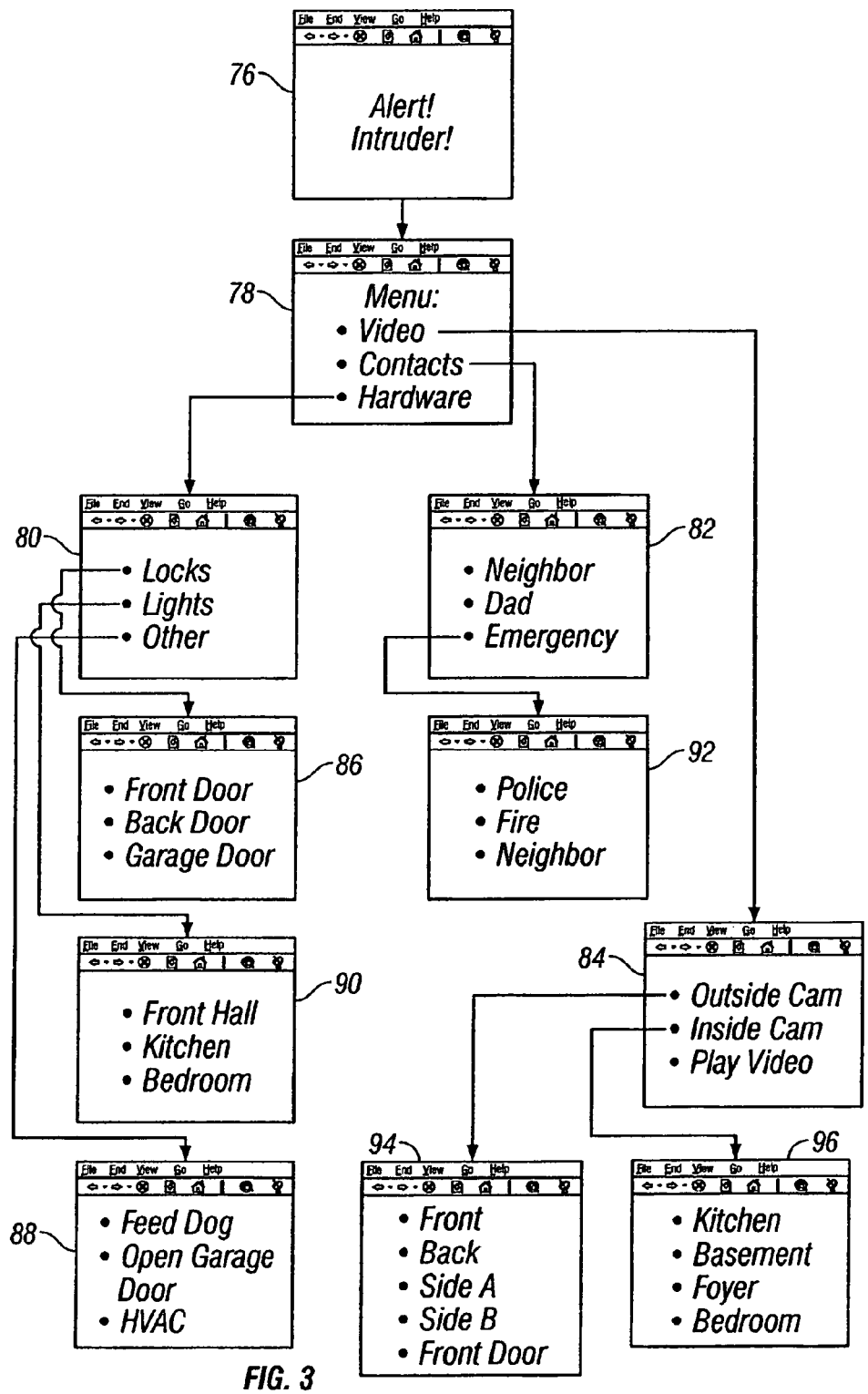
FIG. 3 shows a series of option menus which are presented to the user on the wireless device as part of the FIG. 2/residential embodiment.
Figure 4:
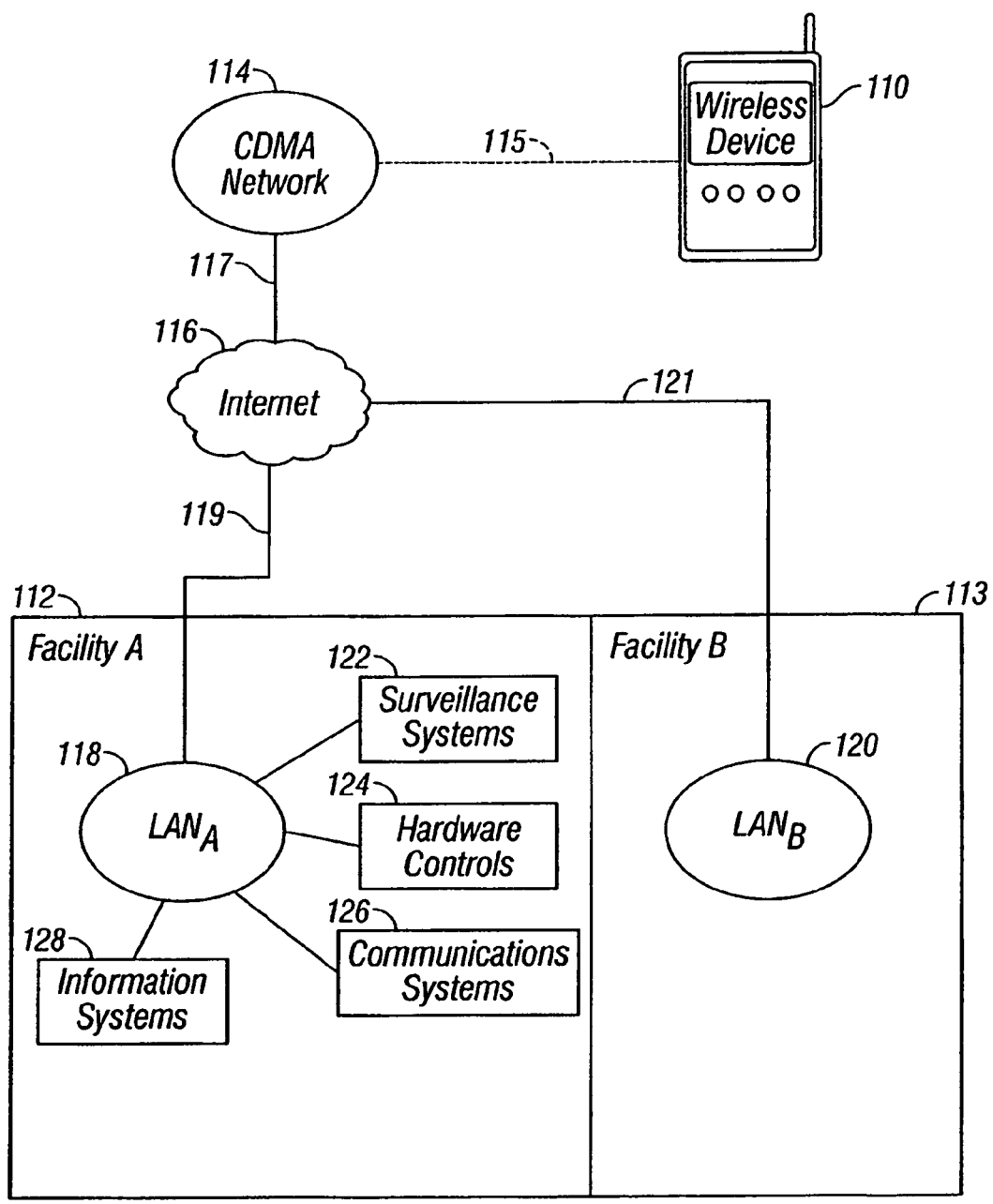
FIG. 4 is a schematic showing an embodiment of the present invention wherein the wireless device is adapted for interfacing with the LAN's of a plurality of schools.
Figure 5:
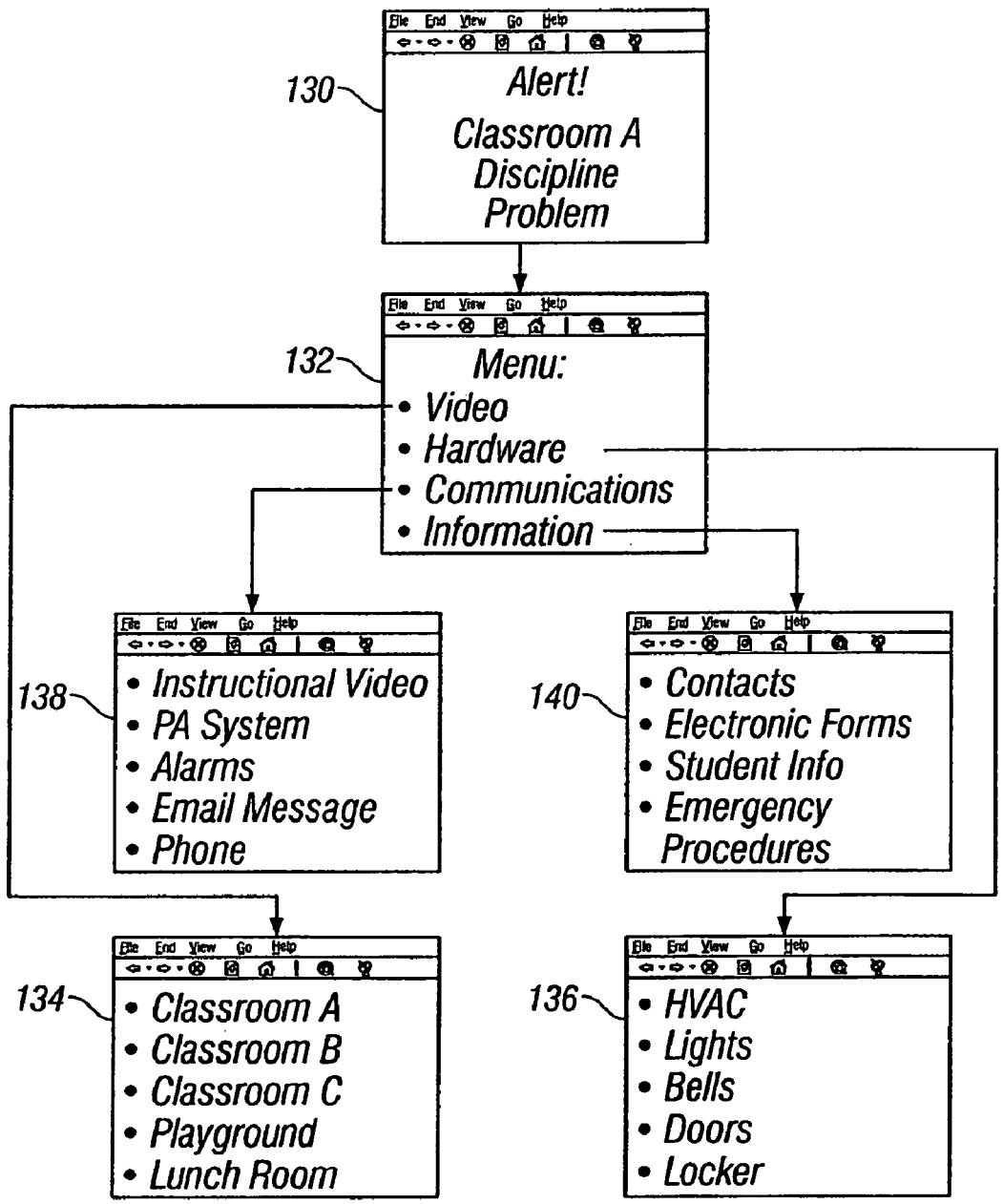
FIG. 5 shows a series of option menus which are presented to the user on the wireless device as part of the FIG. 4/school-system embodiment.
Figure 6:
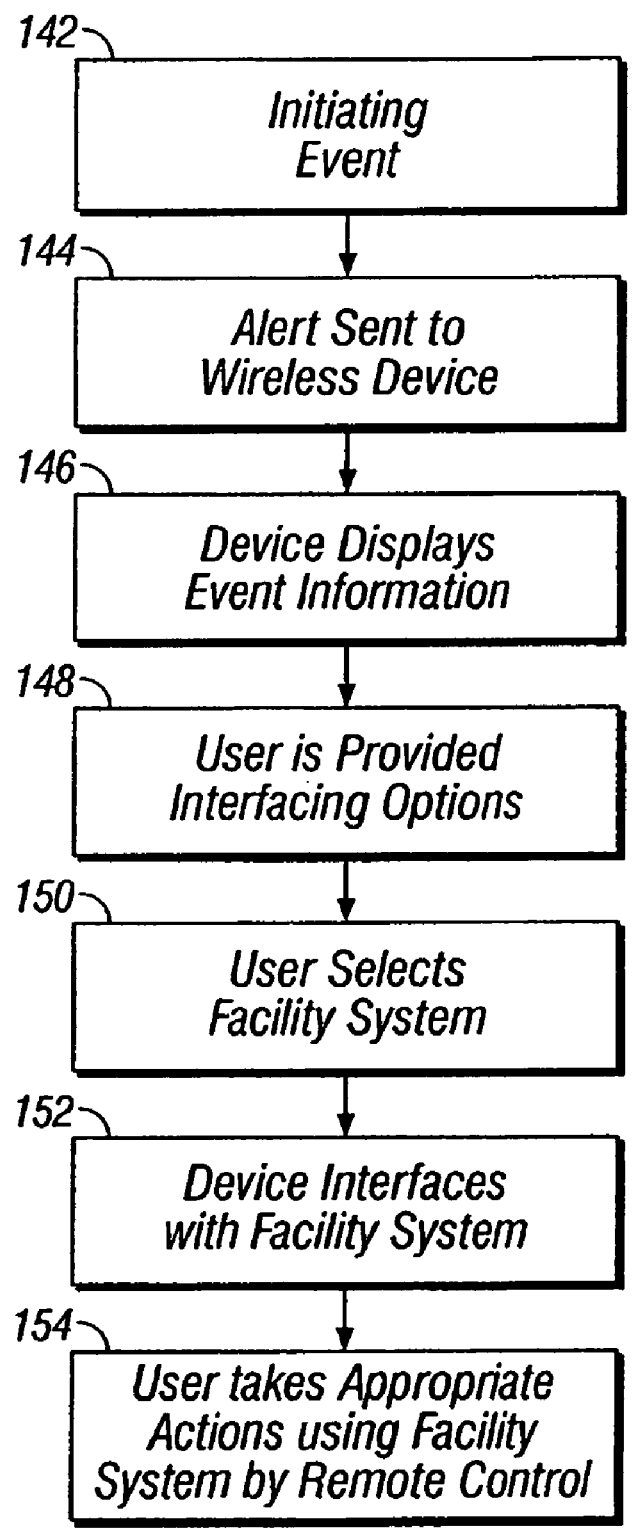
FIG. 6 is a flow chart showing an embodiment of the present invention that comprises a series of steps.

Different embodiments of the present invention are disclosed in FIGS. 1 through 6. FIG. 1 is a high-level process diagram of one embodiment. FIGS. 2 and 3 show an embodiment of the present invention adapted for use in a residence. FIGS. 4 and 5 show an embodiment of the present invention adapted for use in a school system. FIG. 6 discloses a flowchart showing a series of steps which comprise one embodiment of the present invention.

Referring first to FIG. 1, we see an embodiment which comprises a wireless device 10 and a facility 12. It can be seen that facility 12 comprises two systems—a first facility system 14 and a second facility system 16. These systems could be any kind of facility system. Here, the first and second facility systems, 14 and 16 respectively, are seen interfacing with a facility automated control system 22. First facility system 14 presents an interface 18 with the facility automated control system 22. Likewise, second facility system 16 also presents an interface 20 with the facility automated control system 22. It is important to note that though a facility automated control system 22 is shown in the facility 12 in FIG. 1, alternative embodiments of the present invention might also involve wireless device 10 interfacing directly with facility systems 14 and 16. It is believed, however, for practical reasons that an interface 24 between the wireless device 10 and facility 12 will normally take place through some form of computing system which will comprise the facility automated control system 22. This may be a simple computing device or a LAN which is associated with the facility.

Facility 12 in FIG. 1 could be any of a variety of things. For example, in the embodiments disclosed hereinafter, the facility is either a residence or a school. One skilled in the art will recognize, however, that it could be any number of other kinds of buildings, businesses or other facilities. The term "facility" as used in this patent application and its claims is not to be given some more restricted meaning implying a particular kind of structure, building or residence. Rather, the objectives of the present invention would work with a facility that did not include any traditional structure or building. The term as used here should be interpreted as an entity or location having systems. Something from which wireless device 10 may be remotely located.

Wireless device 10 may also embody numerous devices. It may be any form of wireless device. It need not be included within a CDMA wireless network (as will be disclosed in the FIG. 1-6 embodiments. Device 10 could be any java-enabled phone, wireless personal digital assistant (PDA), or a wireless enabled laptop computer. It could also be numerous other devices which are wireless enabled. For example, the present invention could be practiced using other kinds of wireless networks, such as Wi-Fi or infrared communications systems. The use of the term "wireless" should not be construed as delineating any particular wireless system. The term is to be given its most broad interpretation. Essentially meaning substantially not physically wired.

Looking more closely at the wireless device 10, we see that it includes two remote control systems. These are, in this embodiment, computer applications, or different parts of a common application. A first remote control system 26 has been included in the wireless device 10 in order to control the first facility system 14. The second remote control system 28 has been included so that it may communicate with and control second facility system 2. Again, though the interfacing 24 is shown occurring through the facility's automated control system 22, it is, of course, possible that this interfacing could take place directly with the facility systems 14 and 16. Each of remote control systems 26 and 28, in the preferred embodiment, comprise parts of an overall application developed for the wireless device 10. These components of the application enable the wireless device to communicate with a facility in a manner which will be described in more detail hereinafter.

A more specific embodiment of the present invention is shown in FIG. 2. This embodiment is adapted for use in a residence. It shows a wireless device 30 communicating through a wireless line of communications 38 with a CDMA network 34. The wireless device 30 is used to communicate with an in-home manager 32. The interfacing 38 occurs in a manner known to those skilled in the art. Communications 38 will be possible so long as wireless device 30 is located within the service area of the CDMA network 34. A CDMA network 34 is typically linked through a line of communications 40 with the internet 36 in a manner known to those skilled in the art. The internet 36 can be tapped into by manager 32 using an Ethernet cable to comprise line 42. Ethernet cable 42 can be received into an Ethernet receptacle 44 on the back of device 32 in order to link it with the wireless device through cable 42, internet 36, line 40, network 34, and wireless line of communications 38.

Examples of the kinds of devices capable of serving as manager 32 are disclosed in commonly-owned U.S. patent application Ser. Nos. 10/236,286 and 10/694,337—both now pending. Manager 32 will include computing and electronic components arranged in a manner known to one skilled in the art.

Manager 32 comprises four major components. A first component is an interfacing component 46. This is much like the interface located in a standard PC. One skilled in the art will know how Ethernet cables are fixed into a computing unit such as is shown in FIG. 2 here. A second component of manager 32 is the power component 48. Power component 48 includes a plurality of power controls 48. A third component of manager is a monitoring component 50 which includes a plurality of input/output jacks 56 (e.g., RCA jacks). The fourth component is an AV component 52 which includes video jacks 58 which are used for audiovisual purposes.

Each of these four components performs particular functions. We will first discuss the specifics of how power controls 48 and power receptacles 54 are used along with the present invention.

A first function of the power control component 48 is to control the lighting system of the facility. A lighting system 60 is shown in FIG. 2 as being managed by device 32. Though lighting system 60 is represented in the figure as a single light, it should be recognized that this is an extremely simplified embodiment. In actual use, numerous receptacles would likely be devoted to lighting. Thus, the lights in different rooms and in different areas outside the house could be individually controlled by the system.

By communicatively connecting, thus, interfacing manager 32 with wireless device 30 as shown, the user is able to, e.g., remotely turn a light on or off in a bedroom. To accomplish interfacing between wireless device 30 and manager 32, it is necessary that both include software enabling the interfacing. The software developed on each is within the skill of one skilled in the art.

This software will enable the handheld user to navigate through options menus presented on the handheld to select a particular light at a particular location in the house, and then turn that light on or off.

A connector of the plurality 54 could also be associated with an HVAC system 69. The HVAC may be turned on, off, and temperatures set using manager 32 which is controlled using handheld 30.

The device 32 could also be used in the residence to control a robotic device 62. In this embodiment, the device 62 is disclosed as an automatic pet-feeding device. One skilled in the art, however, will realize that numerous kinds of robotic controls could be activated or deactivated using power controls 48.

Other examples of devices in the home which could be managed by the power controls 48 are a plurality of door locks 64, a garage door opening device 66, and an alarm system of some sort 68. One skilled in the art will recognize that numerous other devices could be interfaced with by the power control component 48 to remotely control a plethora of things in the home.

Monitoring component 50 of the present invention and its associated input/output jacks 56 are likely to be used as part of the surveillance system in a home. For example, a sound detection system 70 could be attached to one jack of the plurality 56 as part of the monitoring system 50. Also connected to the jacks 56 could be a plurality of cameras 72. Though only one camera 72 and one listening device 70 are represented in FIG. 2, one skilled in the art will recognize that with a typical home system numerous cameras and numerous motion detection devices would be employed for effective monitoring through these and possibly additional jacks. Through device 32, a remote user in possession of the wireless device 30 is able to control each of these individual cameras from any location within the CDMA network.

With respect to the sensors 70, they may be used to initiate an alert process. In this process, when a sensor is tripped, a chain reaction results. Sensor 70 will detect some kind of motion (e.g., a burglar in the home) which will be sensed by the monitoring component 50 of manager 32. Because of the present invention, this alarm would be received through the internet 36 and CDMA network 34 by wireless device 30. Once the alert signal is received by wireless device 30, an audible and visible alert will be presented. Once recognized by the user, the user may respond by navigating through a series of menus to receive live video through camera system 72. This enables the user to observe what is occurring, or has occurred at the residence. It is common knowledge that numerous false alarms occur which might trip an alarm system. For example, a friend or family member may enter the house not realizing the alarm system is up and set it off. This system of the present invention would enable the wireless-device-enabled user to decide whether law enforcement needs to be contacted as the result.

With respect to A/V component 52, this RCA jack 58 would most likely be used to deliver video content to a television within the home. This television might be used to display selected video content at the whims of the holder of the wireless device 30. It also, however, might be used to display alert information to someone in the home. For example, jack 58 could be connected to a VCR, DVD, or a video on demand system which would allow for the playback of pre-recorded video materials. These devices could be activated and deactivated using the wireless device 30. Wireless device 30 could also present live video. This could be done using a camera associated with the handheld device 30. It could also be done by transmitting a live video feed from the camera system inside the home. For example, the person with the handheld device could alert a family member in the upper bedroom of the house that a prowler had entered the basement, and even show a live video feed to the family member of the intrusion via a television in the upper bedroom. This would enable the family member to appropriately respond to the intrusion.

Moving on now to the representation in FIG. 3, we see that an elaborate series of computer screen shots is shown. These screen shots are examples of options menus which are displayed on wireless device 30. The menus are shown in sequence. This sequence is the order in which a user would select them.

A alarm screen shot 76 is an alert notification. Alert notification screen 76 pops up automatically. It alerts the user that an intruder has been detected in the home by the motion detection system discussed in FIG. 2. With the embodiment disclosed in FIG. 3, this alert would be associated with some sort of sound coming from the wireless device which would sound or other sound vibration or other sensory perceptible event. The sounds and/or vibrations should enable the user to immediately become aware that a situation has arisen that demands immediate attention.

In the disclosed embodiment of this "alert" stage of the process, only a single alert screen has been shown. It is possible, however, that a series of automatically popped up screens would be provided. Alternatively, a single screen could be provided which displays numerous other details regarding the event. Regardless, the alert screen, or screens should be informative. They should display information which enables the user to understand the nature of the event taking place at the facility (residence). Ideally, sufficient specifics should be displayed to enable the user to immediately and precisely respond. For example, if the sensors in the home detect an individual has tried to open the front door, this would be displayed along with the alert so that the user could take live video from the properly located camera.

After alert screen 76 has automatically popped up on the wireless device 30, it may easily by dropped by pressing some button on device 30 in a manner known to those skilled in the art. After screen 76 is dropped, an options menu 78 is presented to the user.

Menu 78 would comprise options for the user to make in response to the event in the residence. In the FIG. 3 embodiment, these options are presented as "video," "contacts," and "hardware." Once presented with this menu, the user could simply click on or otherwise select which item is the first selection for response to the event.

If the user selects the "hardware" icon, he or she will be directed to a subsequent screen 80 which gives the options of "locks," "lights," and "other." For example, the user may want to unlock the door for a child that has come home from school. To do so, the user would then click on the "locks" icon on screen 80. This would reveal a subsequent screen 86 which would enable the user to select which door to unlock from the group comprising "front door," "back door," and "garage door." Physically, this would be accomplished using the power controls 48 devoted to the home's system of locks 64. See FIG. 2. Selection of the particular door in menu 86 would result in it being either unlocked or locked.

Returning now to screen 80, the user could alternatively select the "other" option. After doing so, the user would be presented with a subsequent screen 88 presenting the options of "feed dog," "open garage door," and "HVAC." It is noteworthy that each of the selections made on the wireless device relate to specific items in FIG. 2. For example, the menu 88 option of feeding the dog relates to the FIG. 2 pet-feeding control 62. Likewise, the opening garage door option, if clicked on, will result in the activation of the garage door system 66 joined with power control 48 on manager 32. Finally, clicking on the HVAC option of menu 88 will result in control over the facility's HVAC system 69 by manager 32.

Similarly, the lock options of menu 86 will result in the locking or unlocking of the residence's lock systems 64 at the command of manager 32.

Referring back to menu 80, if the "lights" option is selected, a selection menu 90 will pop up in which "front hall," "kitchen," and "bedroom" options are presented. By clicking on these options, the user is able to turn on or off the lighting in each of these rooms. These options can be matched up with the lighting system 60 represented in FIG. 2 which is managed by the power controls 48 of the manager at 32.

Referring now back to menu 78 (which is the original menu), selection of the "video" option results in the generation of screen 84 which is a menu listing "outside cam," "inside cam," and "play video" options. Selection of "outside cam" in menu 84 will result in the generation of menu 94 which includes the options of various camera locations from which the user is able to view for surveillance or other purposes. For example, by clicking on "front," the user will be able to see who is at the front door using camera system 72. The viewer might likewise click the "back" button to see if a prowler exists around the rear of the home. Through this menu the user is able to view essentially any location on the outside of the home.

Clicking on the "inside cam" option will generate in menu 84 will result in generation of a list shown in a menu 96 which includes the options of "kitchen," "basement," "foyer," and "bedroom." Each of these options enable the user to select a location inside the house (or other facility) in which viewing is desired.

For example, if the user is given a notification on the wireless device 30 that an intruder exists in the basement of the home, that user can then access menu 78 to start the navigation process. Once in menu 78, the user would be able to click the "video" selection to bring up screen 84. From screen 84, the user could select "inside cam" to bring up menu 96. From menu 96 the user would be able to specify the location within the home—for the purposes of this example—selecting "basement" because that is the location in which the sensor was tripped as revealed in the alert notification in screen 76. Thus, by making the appropriate navigation through the system of menus provided, the user is able to quickly assess the situation through the camera system 72 to determine if it is appropriate to contact a law enforcement agency or a neighbor.

Similar arrangements could be made if the sensor were to trip on the outside of the residence. In such a case, the user, once menu 84 was brought up, would simply click on the "outside cam" selection and then select the appropriate camera from menu 94. This would, as a result, cause a live video feed to be presented on device 30 from the system of cameras 72.

The final selection provided in menu 84—"play video"—is used to actually play video content in the facility (which in this case is a residence). This selection could be made to play prerecorded warning messages or other informative video for an inhabitant of the residence. Live video could also be played after this item was selected. It is also possible that the remote user could cause a television within the home to play live video from one of the cameras of the system 72.

The FIG. 2 manager 32 is interfaced with by the remote device 30 in all of the above examples. For example, the system of sensors 70 associated with manager 32 would likely be disposed in numerous locations within and outside the home. When one of these sensors was tripped, the information that it had been tripped will be recognized by manager 32. Manager 32 then transmits a signal including not only that a sensor has been tripped, but also the exact location of the sensor, and possibly other information regarding the tripped sensor. The manager then, through Ethernet connection 42, accesses the internet 36 which is linked to the CDMA wireless network. Through a wireless signal, the information regarding the tripped sensor and its precise location (e.g., basement window) is then received by the wireless device 30.

An application on the wireless device 30 is initiated in response to the alert information received regarding the sensor. The programming required will be within the skill of one skilled in the art. The application will take the information received and generate at least two things. First, the exact location for the trip sensor be delivered as part of the alert message received on alert screen 76. Second, some sort of sound or vibration or other notification means will be generated to alert the user that an emergency has occurred and compel them to look at the alert display on the device. Thus, after the user has received the emergency message, and knows the exact location of the sensor which has been tripped, he or she is able to adequately respond.

The response will be accomplished by navigating through the appropriate screens as shown in FIG. 3. For purposes of the burglar example, the user is able to access the camera network 72 and the alert camera network 72 by selecting the "outside cam" or "inside cam" selections from screen 84. Similarly, the same user would be able to, by selecting the "play video" selection from screen 84, play prerecorded video content or actual live content received over the cameras to an individual in the house. This might be convenient, for example, if the holder of the handheld wireless device wanted to warn somebody about a location in the house on a TV monitor in that location. It is noteworthy that FIGS. 2 and 3 are simplified to a great extent. Obviously more menu selections would be required in FIG. 3 to be able to enable live video content to be displayed on a particular monitor at a particular location in the house. These, however, would all be within the knowledge of one skilled in the art and could be accomplished using known software and hardware.

Similarly in alert from a sensor on screen 76 indicating that there was an individual at the front door might prompt a user to select from menu 78 the "hardware" option and then once screen 80 is generated select "locks." Then screen 86 would pop up giving the user the ability to unlock the front door for a child that had come home early from school. Physically, the front door could be unlocked by navigating to screen 86, and then unlocking the door lock. The door lock would be part of the home's lock system 64 which is able to be controlled by the power control portion 48 of manager 32 (see FIG. 2). This would all be conducted, of course, wirelessly through interfacing between wireless device 30 and manager 32. This interfacing as has already been discussed above will be accomplished through a wireless connection 38 through the CDMA network 34 through the internet 36 and via an Ethernet connection 42 which is physically connected to manager 32 at connector 44.

A more elaborate system for use in a facility, or a plurality of facilities, is disclosed in FIG. 4. Referring to the figure, we see that a wireless device 110 communicates with a CDMA network 114 through a line of communications 115 just like with FIG. 2. Also like FIG. 2, the CDMA network 114 interfaces with the internet 116 via an interface 117. Unlike the FIG. 2 embodiment, however, the FIG. 4 embodiment may serve two separate facilities, here facility 112 and facility 113 (labeled as facilities "A" and "B"). A local area network, LANA communicates with the internet via an interface 119. Second facility 113 (labeled as facility "B") also includes a local area network, LANB 120 which communicates with the internet via a separate interface 121. In this embodiment, facilities A and B are schools. They could, however, be any kind of building, facility or other locale and work equally well with the methods and systems of the present invention.

In facility A 112, LANA 118 is used to manage a number of systems. For example, LANA 118 is shown interfacing with the facility's surveillance system 122. LANA 118 also communicates and interfaces with the facility's hardware control system 124. The facility's communication systems 126 are also incorporated into LANA 118. Finally, LANA 118 also interfaces with and is used to control the facility's information systems 128.

With respect to facility B 113, the surveillance, hardware, communications, and information systems have not been replicated. But they do exist. They would be incorporated into LANB 120 just like with LANA 118 shown in facility A 112 opposite it. These systems have simply not been replicated in order to save space.

With respect to these numerous systems within each facility, the surveillance systems 122 might include, e.g., cameras in each classroom, on playgrounds, as well as motion detectors positioned about the building.

The hardware controls 124 might include automated HVAC, lighting, alarm, bells, door locks, and locker locks.

The communication systems 126 might include alarms, instructional video playing devices (such as VCR/DVD systems, video-on-demand systems), email messaging systems, and phone systems possibly including elaborate voice mail arrangements.

With respect to the information systems 128, included might be contacts information maintained on a database on a computer system on the LANA 118. Electronic forms might also be included in a similar database. Also included might be student information (e.g., parents' names, addresses and phone numbers), and also a listing of emergency procedures. The location of these databases would likely be maintained on a PC or perhaps even a server on LANA 118.

The systems in facility B, and other facilities would likely have these same types of arrangements. At some place associated with LANA 118, a software application is able to consolidate all of these separate systems (122, 124, 126, and 128) so that they are controlled by the same application. This application is also able to interface through the internet 116 and CDMA network 114 with the wireless device 110.

Wireless device 110 also includes a software application or a plurality of software applications. This software arrangement enables the interfacing between device 110 and each of the facilities. A portion of this application will be devoted for each of the systems 122, 124, 126, and 128, which are present in the particular facility. For example, with respect to surveillance system 122 and facility A 112, a special application will be present on wireless device 110 which will enable that wireless device to communicate with the surveillance system 122 through LANA 118. Similar applications will be loaded onto device 110 to support the hardware control system 124, the communication system 126, and the information systems 128. The generation of this type of application and the specific programming languages and techniques used will be within the knowledge of one skilled in the art.

With respect to facility B, assuming that the facility systems connected into LANB 120 are the same as the systems connected into LANA, the same software applications could be used on wireless device 110 to interface with these facility B systems as well. Thus, a high level administrator would be able to interface with a plurality of schools from the same handheld device. Though only two facilities (facilities A and B) are shown in the FIG. 4 arrangement, it is important to note that this arrangement has been greatly simplified. It is within the scope of the present invention that any number could be present and still fall within the scope of the present invention. Even hundreds of facilities could be included within the arrangement of the present invention. Only two have been shown here, however, in order to simplify matters.

Turning now to FIG. 5 we see that a series of menus is offered. This sequence of options menus are similar to those disclosed in the FIG. 3 arrangement of the last embodiment, but there are differences. In this arrangement, one of the school's facility systems 122, 124, 126, or 128 will initiate an alert regarding an event. For example, the event may be a fight in a classroom A. The teacher in that classroom could then initiate an alert via a phone, PC, or panic button.

This starts the alert notification process. Once the alarm has been initiated, e.g., a teacher hits a panic button in a classroom, the particular system, e.g., surveillance system 122, will transmit a signal or message which will be sent through the LANA 118, via the internet 116, over the CDMA network 114 to the wireless device 110.

Once wireless device 110 receives notification of the event, it is recognized by a software application loaded on the device. This software application causes an alert notification 130 to appear on the wireless device informing the user of the location and a description of the problem—much like with the embodiment disclosed in FIGS. 2 and 3. Also like with the earlier embodiment, an audible signal and or vibration will accompany the notification.

As can be seen in screen 130 of the FIG. 5 embodiment, we see that a discipline problem has arisen in classroom A.

After receiving this notification 130, a menu 132 will pop up. This menu gives the user a plurality of selection options. These options are disclosed as "video," "hardware," "communications," and "information." Other options could, of course, be introduced here as well if additional systems were present on the facility's local area network. These four systems have been shown here in order to simplify the present invention for support of the present invention.

By selecting the "video" option, the handheld user will be directed to a subsequent menu 134 with a plurality of options. Each option shown represents a different location in which a live video feed can be received on the handheld device so that the administrator can observe exactly what is going on in the particular location in which the alert was originated from, or, alternatively, view other locations of interest. For the discipline problem example here, the administrator is likely to click on the "classroom A" option since that is where the discipline problem was stated to have been occurring.

Though this embodiment discloses the selections being provided and requires the user to actually select them, it is important to note that alternatively, rather than a menu arrangement, the user could alternatively automatically be directly linked with the live video feed from any location from which an alarm has emanated. In such a circumstance, an alert screen 130 would possibly be displayed, but a menu system would not be provided. Instead, a live video feed would automatically be displayed on the handheld device. This may be an alternative embodiment, or could be incorporated into the same embodiment as a preset alternative to the user so that the user could decide which arrangement he or she likes best.

Referring back to menu 132, selection of the "hardware" option would direct the user to a subsequent menu 136 providing the options of different hardware systems within the facility which are able to be controlled by the handheld device 110. These options might be used for different circumstances. The options here give the user the ability to control the facility's HVAC system, lights, bells, doors, or open lockers via the handheld device 110. Each of these different options might be used in a variety of circumstances. For example, the handheld user might receive an alert from a particular classroom in which the temperature has become uncomfortable. The administrator could then remotely change temperature settings using the facility's HVAC system using the handheld device. Alternatively, the user might receive an alert that a motion sensor has been tripped (in the middle of the night) in classroom B. As described in the paragraphs above, the user would be able to receive a live video feed from classroom B to see if circumstances existed that warrant calling a law enforcement agency. However, it would obviously be helpful in receiving this video feed if the lights were on. To do this, the user would navigate to menu 136 and activate the lights in that classroom so that the video feed, once received, would be so that the classroom would be more visible to the user. Upon observing the classroom, if an intruder was detected, the user could call the police.

It is likely that subsequent menus (beyond the selection shown in 136) would be used to further control the lighting and HVAC. This version has been greatly simplified in order to make it more manageable. However, subsequent menus could enable the user to control the lighting in particular classrooms, and allow the heating and cooling systems to be activated with respect to specific locations.

Other options listed in menu 136 are the bells, doors and lockers. Much like with the FIGS. 2 and 3 embodiments, these features can be controlled remotely as well. The door lock feature might be particularly valuable. For example, at some schools the custodian is responsible for unlocking the school in the morning before classes resume. In the case that the responsible custodian was sick, or otherwise unable to come in to work that day, the present invention could easily overcome the dilemma. To do so, the custodian would simply initiate an alert (via phone, email, or other means) that he or she was not going to be able to come to work that day. Upon receiving the alert, an administrator could unlock the doors remotely using wireless device, negating the need to make a special trip to the school just to unlock it.

With respect to the "lockers" feature, sometimes, because of privacy interests of the students, only certain administrators will have access to the automatic lock systems which control the lockers of the students. In the circumstance a teacher observes a student putting some form of contraband into their locker (e.g., a weapon) it may be important that the locker be opened immediately. Rather than waiting for the administrator to show up to the facility, as would be required by the prior art systems, the administrator can simply unlock the locker remotely using the handheld device 110.

The remote system also enables the user to interface with the facility's communication systems. This is done by making the appropriate selection in menu 132 which brings up a subsequent menu 138 which enables the selection of a number of communication subsystems within the facility. By clicking on the appropriate selection, the user is able to remotely cause communications within or outside the facility in an unconventional manner. For example, the administrator could, from a remote location, play an instructional video for students in a facility classroom. The administrator could also remotely access the PA system for a particular classroom or for all the classrooms or for multiple facilities for that matter using only his or her handheld wireless device. The administrator could also activate the alarm systems within the facility remotely. Additionally, the administrator could access the facility's email systems and send or receive emails by interfacing with equipment included in the local area network of the facility. The facility's phone and voice mail systems could also be tapped into remotely.

If the user were to click on the "information" selection of menu 132, a subsequent menu 140 would be displayed on the handheld device. This menu would enable the user to access the facility's contact information. This might include all of the faculty and other staff of the school. This contacts information would likely be included in a database within the local area network of the facility. Also an option in screen 140 is a selection of "electronic forms." This database could be accessed in order to obtain the appropriate forms, e.g., to fill out a form required by the state following a fight or other disciplinary situation that has been observed. Another important option provided in menu 140 would be student information. Student information may be necessary in order to contact parents of children involved in fights, or in other circumstances. Thus, an administrator for a number of schools might be able to access student information from a particular facility's information database system. Menu 140 also provides the user the ability to access emergency procedures that are to be followed. These procedures could be included in a database which would be accessed by a series of menus provided on the handheld device.

By using the series of menus along with alert 130 on the handheld device, the user is able to effectively interface with the school systems to accomplish objectives in a manner not before possible. For example, an administrator would be able to immediately receive an alert of an event in a particular classroom. This alert menu 130 would be, like in the last embodiment, accompanied by an audio indication or vibration to attract the user's attention. Then, without going anywhere, the user would be able to immediately see what was going on in the classroom over their handheld device. If the example were a disciplinary situation, such as a fight, the teacher would most likely want to bring up information regarding the students in the particular classroom involved. This would involve clicking to the information prong of menu 132, drawing up menu 140, and selecting "student information." This student information would include the names of all the people in the particular classroom. The teacher could use that to identify the students in the fight (pictures could be included in the database) and notify the parents of those individuals involved immediately without other involvement. Some states and other governmental agencies require an administrator to fill out forms in the event that there is a fight. This could easily be handled, for example, by navigating to screen 140 and accessing the "electronic forms" prong of the menu. This would cause the facility systems to access the database and pull up the appropriate form. Thus, the administrator could observe the classroom activity, contact the parents, and fill out the appropriate forms without ever having to change locations.

Consideration of the embodiment disclosed in FIGS. 4 and 5 causes one to realize that the systems described would enable a user of the handheld device to accomplish numerous objectives by interfacing with the system equipment too numerous to specify herein.

FIG. 6 discloses a flowchart showing a step-by-step process of one embodiment of the present invention. The first step in this process is that an initiating event occurs in step 142. This could be an intruder detected by a surveillance system, a fight, and an indication of unreasonably high temperatures in the facility, etc.

Immediately, an alert is transmitted to the wireless device in step 144. In the FIG. 2 embodiment, this might occur as a result of a surveillance sensor being tripped. This would cause the monitoring component 50 of manager 32 to transmit communications through its Ethernet connection to the CDMA network 34 through the internet 36. A CDMA message 38 would then be received by wireless device 30. This would cause the alert screen 76 to be presented on the wireless device 30.

In the FIG. 4 example, step 144 might take embody an alarm being transmitted by a teacher. The teacher might simply hit an alarm button, or send an email or call an emergency number to activate, through LANA 118, a signal through the internet 116 and CDMA network 114 to the wireless device 110. After the wireless device receives the alert (with respect to either embodiment), the device will display event information in step 146. This information could take many forms. In the two examples provided, it would indicate either the presence of an intruder (see FIG. 3) or the existence of a disciplinary problem (see FIG. 5). Along with the display, an audible sound or other attention-grabbing feature of the portable wireless device might be activated to get the user's attention.

After the user receives the display of event information, that user will be provided an options menu in step 148. This may be automatically brought up, or brought up as the result of taking some action (a mouse click, e.g.) to drop the alert and display the menu. Step 148 will provide the user with different systems which can be interfaced with in response to the event which prompted the alarm. For example, with respect to the FIGS. 4 and 5 embodiment, surveillance system 122, hardware controls 124, the communication system 126, or the information systems 128 could all be accessed depending on the selection made by the user.

After being presented with each of these options, in step 150 the user selects a particular facility system with which to interface, and takes an action to select the desired system using the options menu.

After this selection has been made, in step 152, the device interfaces with the facility system. This is done using software on both the wireless device and a facility system (either a smart device such as manager 32, or a more complex computing network such as LANA 118). The software loaded on each enables the wireless device to interface with the facility system over the internet through a CDMA or other wireless network.

Once the interfacing arrangement has been set up in step 152, in step 154, the user will then be able to execute objectives remotely. For example, turn on the lights, turn down the temperature, unlock a door, sound an alarm, activate a camera, open a garage door, inter alia, all of which conventionally were only able to be done by traveling to the facility and gaining access its systems directly, or through a local area network for the facility. This is done using the facility system by remote control. Using the FIG. 2 embodiment as an example, when a person has been required to stay at work longer than expected, they would be able to use the process described in steps 142 through 154 to interface with a robotic system present in their home in order to feed a pet or accomplish some other kind of objective. This could all be done remotely without having to call a neighbor or go home to do it in person.

As can be seen, the present invention and its equivalents are well-adapted to provide a new and useful method of interfacing with the systems of a facility using a wireless handheld device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

What is claimed is:
1. A method of displaying video in a residence comprising:
receiving an indication of an alert communicated from a security system of a residence;
communicating the indication of the alert to a cellular telephone, wherein the alert indicates a reason for the alert being detected by a sensor, wherein the alert indicates a camera closest to a location of an event detected by the sensor that activates the alert, the home including motion sensors and audio sensors;
receiving a selection from the cellular telephone, the selection associated with the alert and a camera in the residence associated with the security system, the camera capturing the video in real-time, the video is an alert for an inhabitant of the residence;

receiving a selection of a television communicated from the cellular telephone, the television being selected from a plurality of televisions dispersed at different locations throughout the residence;

determining locations of one or more individuals and the inhabitant in the home utilizing the security system to identify the selected television;

receiving a selection from the cellular telephone to display the video from the selected camera on the selected television;

displaying the video from the selected camera to the selected television in one of the locations dispersed throughout the residence in response to receiving the selections from the cellular telephone, the location being associated with an inhabitant of the residence; and changing the video displayed to the television in response to additional selections of a user utilizing the cellular telephone, wherein the selection and the additional selections are made utilizing a menu of available televisions and a menu of available cameras associated with the security system.

2. The method of claim 1, wherein the video is one or more images associated with a location, the alert indicating the location, the location being further associated with the alert and the one or more images associated with a sensor.

3. The method of claim 1, wherein a ring tone is played and a visual alert is presented in response to the received indication.

4. The method of claim 1, wherein the communicating between the security system and the cellular telephone occurs through the Internet in communication with the security system, a CDMA network in communication with the Internet, and the cellular telephone in communication with the CDMA network.

5. The method of claim 1, the selected television being a television in a bedroom of the inhabitant.

6. The method of claim 1, wherein the alert indicates an exact location of the sensor, wherein the alert indicates a reason for the alert being detected by a sensor, the home including motion sensors and audio sensors.

7. The method of claim 1, further comprising:
presenting a user menu options to respond to an event for which the alert was generated, the menu options including controls for video for inside cameras and outside cameras, contacts, and hardware for locks and lights.

8. The method of claim 6, further comprising:
automatically displaying the video from a camera associated with the event on the cellular phone, wherein the alert indicates the security camera closest to a location of an event detected by the sensor that activates the alert.

9. The method of claim 2, wherein the one or more images includes a pre-recorded message.

10. The method of claim 9, wherein the pre-recorded message is a warning or an informative video selected by the user to address a condition faced by the inhabitant of the residence.

11. The method of claim 5, wherein the video is captured by the cellular telephone and communicated to the display.

12. A method of unlocking a door in a residence comprising:
detecting a presence of an individual at an entrance of a residence;
receiving an indication of an alert communicated from a security system of the residence;
receiving one or more images associated with the alert;
communicating the indication of the alert to a cellular telephone;
communicating the one or more images to the cellular telephone in real-time through a cellular telephone network; receiving a selection from a user from the cellular telephone;
receiving a video communication from a camera of the cellular telephone, the video communication is an alert for an inhabitant of the residence;
displaying the video communication from the cellular telephone to a television at the residence, the television being selected by the user through the cell phone;
determining a location of the inhabitant of the residence utilizing the security system for identifying the location of the selected television;
generating a command to unlock a door of the residence in response to the selection; and
changing the video communicated displayed to the television in response to additional selections of the user utilizing the cellular telephone, wherein the selection and the additional selections are made utilizing a menu of available televisions.

13. The method of claim 12, further comprising:
wherein the selection specifies the door from a plurality of doors and whether the door is to be locked or unlocked.

14. The method of claim 12, further comprising:
receiving a voice communication from the cellular telephone;
selecting a speaker associated with the door of the residence in response to received indication; and
communicating the voice communication to the speaker in response to the received voice communication.

15. The method of claim 12, wherein the one or more images may be selected from images recorded by the cellular telephone, images recorded by security cameras in communication with the security system, and pre-recorded video materials in response to a command entered by the user utilizing the cellular telephone, and wherein the cellular telephone network is a CDMA network.

16. A home security manager comprising:
an interfacing component for communicating with a cellular telephone through the Internet and a cellular telephone network, the interfacing component being configured to implement commands received from the cellular telephone;
a monitoring component for monitoring the operation of a plurality of cameras within a home, the monitoring component including a plurality of sensors for sending an alert to the cellular telephone based on motion detection or sound detection, the alert being for an inhabitant of the residence, the monitoring component being operable determine locations of one or more individuals in the home and the inhabitant, the alert indicating a location associated with an event and one of the plurality of cameras nearest the event detected by one or more of the plurality of sensors; and
a video component configured to deliver video content to a specified television at the location of the inhabitant within the home, the specified television being selected by a user utilizing the cellular telephone, the delivered video content being streamed from one or more of the plurality of cameras selected by a user through the interfacing component, the video content being delivered to the cellular telephone through the interfacing component in response to a user selection received by the video component through the cellular telephone, wherein the video component changes the video content in response to additional selections of a user utilizing the cellular telephone.

17. The home security manager of claim 16, wherein the cellular telephone presents a menu for manipulating the interfacing component, the plurality of power controls, the monitoring component, and the video component, the menu allowing a user to select the specified television at a location of an inhabitant of the home and one or more of the plurality of cameras associated with the alert.

18. The home security manager of claim 16, wherein the home security manager automatically presents a user options on the cellular telephone for addressing an event that triggers the alert, and wherein the cellular telephone network is a CDMA network.

19. The home security manager of claim 18, wherein the video content is automatically displayed on the cellular telephone once an audio alert and a visual alert is played, and wherein the interfacing component is utilized to select the video content from video recorded by the cellular telephone or pre-recorded video content addressing the event for communication to the video component.

* * * * *